C. E. WHITE.
SEED SEPARATING MECHANISM FOR PLANTERS.
APPLICATION FILED MAR. 24, 1910. RENEWED SEPT. 11, 1915.
1,179,254.
Patented Apr. 11, 1916.
3 SHEETS—SHEET 1.
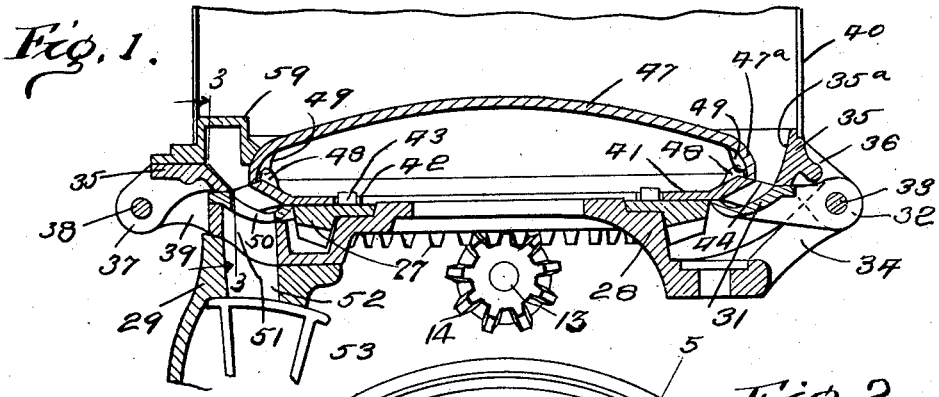
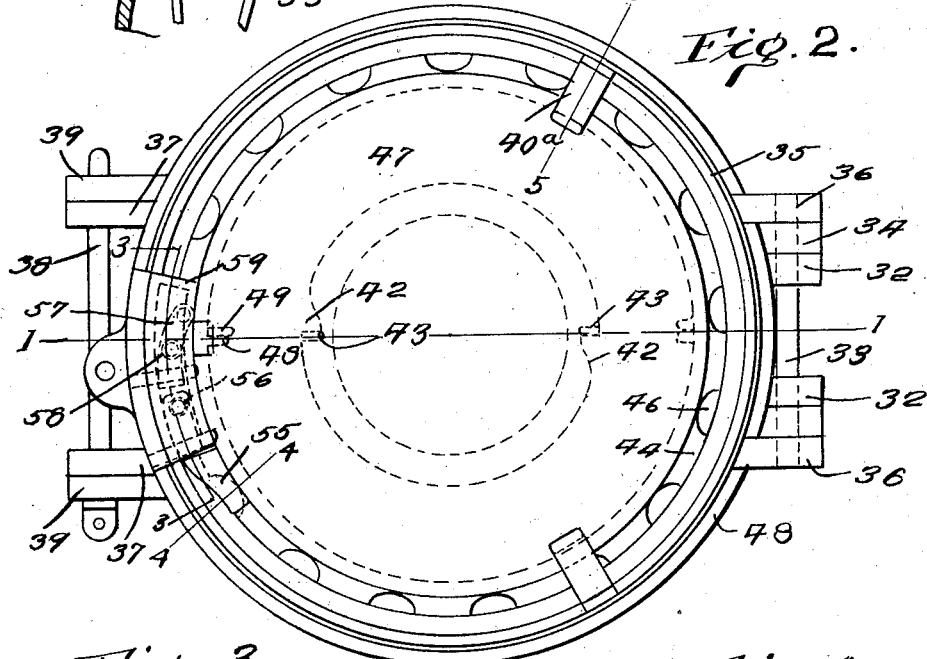
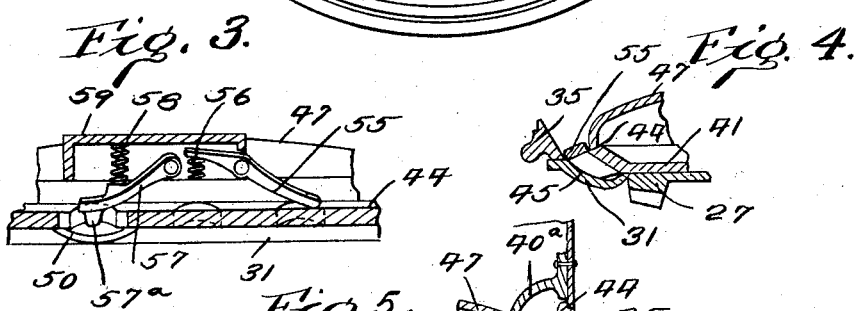
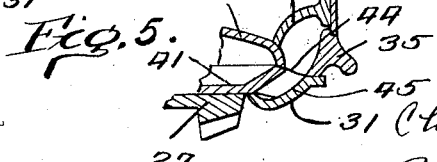

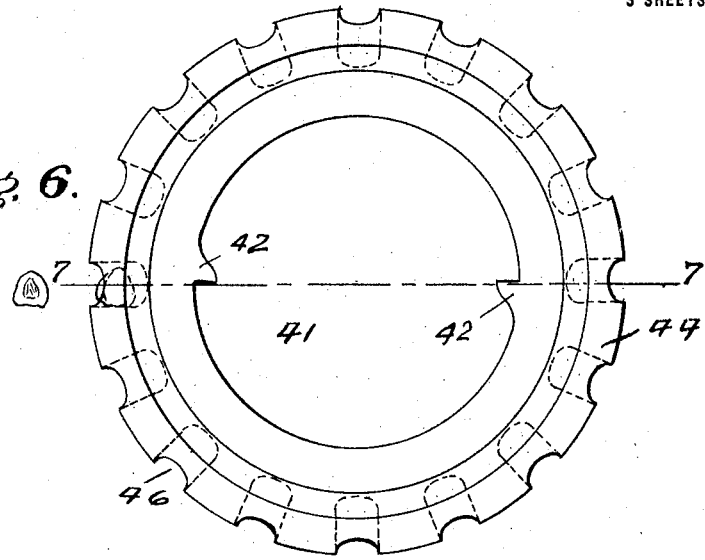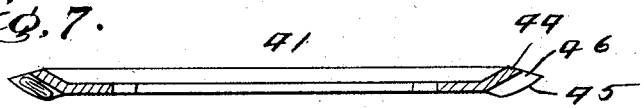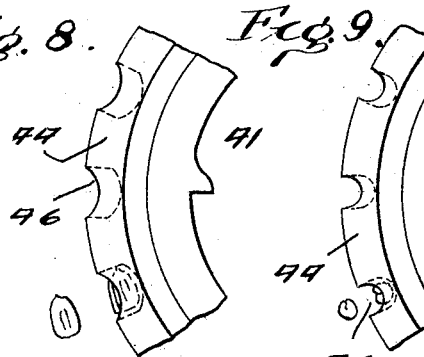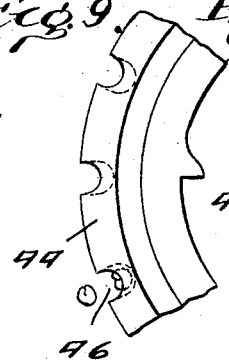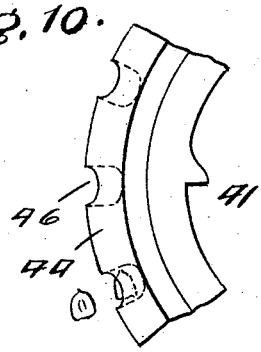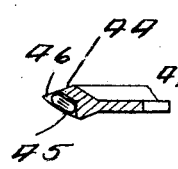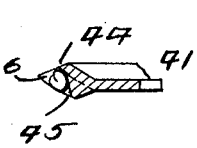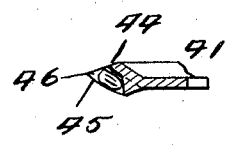

C. E. WHITE.
SEED SEPARATING MECHANISM FOR PLANTERS.
APPLICATION FILED MAR. 24, 1910. RENEWED SEPT. 11, 1915.
1,179,254.
Patented Apr. 11, 1916.
3 SHEETS—SHEET 3.
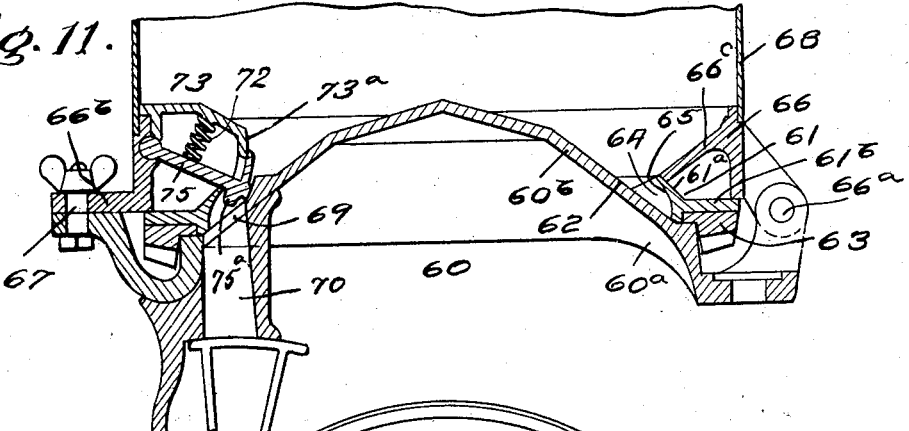
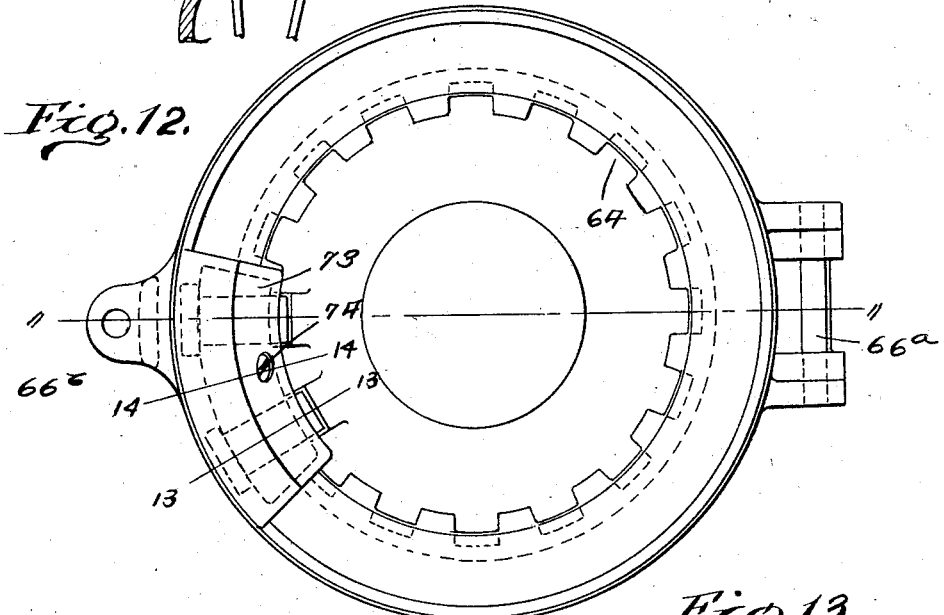
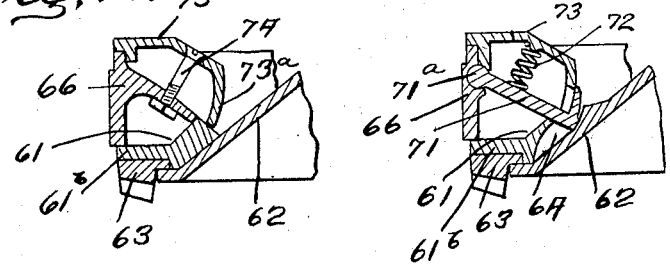
Witnesses
B. G. Bram
R. S. Gehr
Inventor
Charles E. White
By H H Bliss
Attorney

UNITED STATES PATENT OFFICE.

CHARLES E. WHITE, OF MOLINE, ILLINOIS, ASSIGNOR TO DEERE & MANSUR CO., A CORPORATION OF ILLINOIS.

SEED-SEPARATING MECHANISM FOR PLANTERS.

1,179,254.  Specification of Letters Patent.  Patented Apr. 11, 1916.

Application filed March 24, 1910, Serial No. 551,394. Renewed September 11, 1915. Serial No. 50,271.

*To all whom it may concern:*

Be it known that I, CHARLES E. WHITE, a citizen of the United States, residing at Moline, in the county of Rock Island and State of Illinois, have invented certain new and useful Improvements in Seed-Separating Mechanism for Planters, of which the following is a specification, reference being had therein to the accompanying drawing.

This invention relates to seed planters and has to do more especially with seed separating mechanism; that is to say, the mechanism employed for separating the individual seeds or kernels from a mass and delivering them one by one to dropping mechanism.

The invention is especially adapted for use in connection with a planter of the check-row type.

In the accompanying drawings—Figure 1 is a vertical sectional view of the seed plate and hopper bottom mechanism taken on the line 1—1 of Fig. 2. Fig. 2 is a plan view of the hopper bottom mechanism. Fig. 3 is a detail sectional view of the cut-off and knock-out devices, the section being taken on the arcuate lines 3—3 of Fig. 2, and the broken line 3—3 of Fig. 1. Fig. 4 is a detail section view taken on the line 4—4 of Fig. 2. Fig. 5 is a similar view taken on the line 5—5 of Fig. 2. Fig. 6 is a plan view of one of the seed plates. Fig. 7 is a vertical sectional view of the same taken along the line 7—7 of Fig. 6. Figs. 8, 9 and 10 are fragmentary plan and sectional views, showing various forms and sizes of seed cells which can be employed. Fig. 11 is a vertical sectional view of a modified form of seed plate and hopper bottom mechanism, the section being taken on the line 11—11 of Fig. 12. Fig. 12 is a plan view of this modified form of seed plate and hopper bottom mechanism. Fig. 13 is a fragmentary sectional view through the cut-off, the section being taken on the line 13—13 of Fig. 12. Fig. 14 is a fragmentary sectional view taken on the line 14—14 of Fig. 12.

As has been before stated, seed separating mechanisms embodying my invention are well adapted for use on corn planters in which use is made of check wire or other equivalent mechanism for actuating driving devices to intermittently rotate the seed plate through repeated definite angles to carry predetermined numbers of seed cells past cut-off and knock-out devices. Planters having such check wire controlled operating mechanism are now well known, and a detailed description is not necessary.

Referring now to the seed plate mechanism, to which my invention more especially relates, 28 is the base casting of the hopper, which is bolted upon the upper frame work of the seed boot 29. This base 28 is shaped to form a bearing support for the annular bevel gear 27 which meshes with and is driven by the bevel pinion 14 on the operating shaft 13.

31 is a stationary ring which lies outside the gear 27, resting at its rear side upon the base 28, and having at its front side pivot lugs 32 which are connected by a pin 33 to upstanding lugs 34 of the base casting 28. Disposed above and resting upon the ring 31, is a second ring part 35 which is provided at its front side with lugs 36 which are also pivoted on the pin 33. At its rear side the ring 35 carries depending lugs 37 which coöperate with rearward extending lugs 39 carried by the base 28 to secure the ring parts 31 and 35 in position at their rear sides by means of the pin 38. To the upper edge of the ring part 35 is secured a hopper wall 40.

Upon the upper side of the bevel gear 27 is mounted the seed plate 41, said plate being in the form of a ring having inwardly extending teeth 42 which are engaged by upstanding lugs 43 on the gear wheel 27 so that the seed plate will be turned by the gear. The outer portion of the seed plate is thickened and is of peculiar form in cross section, as is indicated in Figs. 1 and 7. The upper annular surface of this thickened part at 44 inclines downward and outward and is preferably plane, while the lower face 45 of this thickened part inclines from the outer edge, where it intersects the surface 44, downward and inward, the surface being preferably somewhat curved in cross section, and then extending somewhat abruptly inward and upward to join the inner, thinner part of the plate. The lower face 45 of the seed plate is formed with a series of recesses or cavities 46, which constitute seed cells, the seed plate itself forming the upper and end walls of the cell while the upper surface of the ring 31, which is formed to fit the curved lower surface 45 of the seed plate, forms the bottom wall of the cells. The top wall of the cells, along vertical section planes, lies approximately parallel to the general direction of the bottom wall, and the shape of the cells thus formed is such that the seeds are received edgewise and lie with one side edge uppermost, in the manner indicated in Figs. 6 and 7.

An upward curved or crowned bottom plate 47 has its down-turned edges resting upon the upper surface 44 of the seed plate, the outer edge of the bottom plate coinciding with or falling just inside of the inner sides of the mouths of the seed cells. The seed plate is provided with upstanding lugs 48, 48, which serve to center the bottom plate 47 upon the seed plate, and also engage depending lugs 49, 49 on the bottom plate 47 to cause the latter to rotate with the seed plate. The hopper wall 40 carries inwardly extending brackets 40ª which engage the upper side of the bottom plate 47 and help to maintain it in its proper position on the seed plate. It will now be seen that the downward and outward curved surface at 47ª of the hopper bottom plate and the upward and outward flaring inner surface 35ª of the stationary ring 35 form an annular downward contracting passage, leading to the mouths of the seed cells. Thus the seeds at the bottom of the hopper tend to move outward and downward as the hopper bottom turns and find their way into this annular passage which directs them with certainty into the seed cells. This action is facilitated by forming the inner surface 35ª of the ring 35 as a continuation of the upper surface of the ring 31, which surface, as has been stated, constituted the bottom wall of the seed cells.

At its rear side and directly over the seed boot 29, the ring 31 is provided with an aperture 50 which registers with a passage 51 in the base casting 28. The passage 51 in turn registers with a duct 52 which extends downward through the seed boot 29. This duct 52 is controlled by suitable dropping valves, which are actuated in suitable timed relation with the seed plate. The upper of these valves is shown at 53. Dropping valves of this character are well known in the art and I need not here describe them in detail, as they do not, in themselves, constitute my present invention.

Above the aperture 50 in the ring 31 is disposed the cut-off and knock-out mechanism. The cut-off is in the form of a pivoted dog 55, the lower active edge of which is parallel to the surface 44 of the seed plate and is normally pressed against it by a coiled spring 56. The knock-out also is in the form of a pivoted dog 57, which is normally pressed downward by a spring 58, and it is formed with a depending lug or tooth 57ª which is adapted to enter the seed cells, as they are moved under it to expel the seeds into and through the aperture 50 and the passage 51 leading to the dropping valves.

59 is a housing which incloses the knock-out and partially incloses the cut-off.

The general operation of the seed-plate, in connection with the dropping valves, will be clear to anyone familiar with this art. It is obvious that as the seed cells, each containing a single seed or kernel, are moved under the cut-off, the superposed seeds are held back by the cut-off while a single seed in the cell moves on beneath the cut-off and over the discharge aperture into which it is dropped or ejected by the knock-out. The number of seeds separated and delivered to the dropping valves with each actuation of the operating shaft will depend, of course, upon the ratio of gears 14 and 27 and upon the spacing of the seed cells. Suppose the construction to be such that the rotation of the operating shaft causes four seed cells to move past the discharge opening and deliver their four seeds upon the upper dropping valve; then upon the next actuation of the check fork these four seeds will be dropped to the lower valve, and, finally, upon the following actuation of the check fork, be deposited in the soil. However, while the operation is, in a general way, clear and obvious, there are certain features in connection with my seed plate mechanism which I desire to point out more particularly. In the first place, it is to be observed that the seed cells are so shaped that the seeds enter edgewise with their longest dimension circumferential with respect to the seed plate. The seed cells are inclined to the plane of rotation of the plate, and the mouths of the cells do not, therefore, open directly upward. For this reason a seed in one of the cells is not subjected to the direct pressure and weight of the superposed mass of seeds, and the tendency of a second seed to crowd and wedge into the cell is correspondingly diminished, as is also the tendency of the superposed seeds to drag the contained seed out of the cell. In a word, my improved seed plate combines with the advantages of the ordinary edge-drop seed-plate, the additional advantage which results from relieving the seeds in the cells from the pressure of the superposed mass.

The inclination of the seed cells has other advantages. It will be observed on reference to Fig. 4, that the inclined central axis of each seed cell lies at an oblique angle to the upper surface 44 of the seed plate and also, therefore, to the working edge of the cut-off 55. This relative arrangement, together with the peculiar formation of the seed cell, makes it possible to separate and deliver, one at a time, seeds of varying sizes with greater accuracy than has been attained with prior constructions with which I am familiar. The peculiar formation of the cell which I here refer to is the contraction of the lower end or side of the cell due to the inward and upward curvature of the ring 31 which forms the bottom wall of the cells. With this conformation of cell, a rather thick narrow seed is prevented from crowding far into the cell and so tends to fill the cell at its mouth about as completely as does a thinner but wider seed. Furthermore, by reason of the inclination of the working edge of the cut-off to the axis of the cell, the mechanism is adapted to accurately separate individual seeds or kernels having widths of comparatively wide variety. Consider, for example, two seeds or kernels lying on their sides in two of the cells and of different widths; the difference in the clearance between the upper edges of said kernels and the working edge of the cut-off, which lies at an angle of, say, 45° to the axis of the seed cells, is less than the difference in the actual width of the kernels. In other words, a relatively small clearance between the cut-off and the upper edge of the nearest seed, that will be individually separated and discharged with unfailing accuracy, permits such an accurate separation and discharge of a much wider seed or kernel than would be possible if the walls of the seed cell and the edge of the cut-off were at right-angles to each other.

A seed plate such as I have shown possesses still another advantage, which is that it makes possible the variation of all three dimensions of the seed cell without any variation of the external dimensions of the seed plate. This is important, as it makes it possible to provide a series of plates adapted for all forms and sizes of seeds such that the plates can be freely interchanged without any modification of the coöperating parts of the hopper mechanism.

In Figs. 8, 9 and 10, I have shown fragments of three plates having the same external dimensions as the plate shown in Fig. 1 and in Figs. 6 and 7, but in which the size and shape of the cells are varied to receive seeds of different kinds. Thus in Fig. 8, the seed cell or cavity is not extended entirely through the thickened portion of the seed plate, the plate being adapted to work with seeds that are long but not as wide as the seeds for which the plate shown in Fig. 6 is adapted. Again, in Fig. 9 is shown a cell adapted to work with approximately round seeds such as peas; while in Fig. 10 is shown a cell suitable for rather short, thick, and narrow seeds. All four forms of plate, as has been stated, are of the same external dimensions so that they can be freely interchanged, one for the other.

In Figs. 11 to 13, I show a modified form of seed plate mechanism which, while not the construction I prefer, possesses some of the advantages of the preferred construction which has already been described. In this modified construction 60 is the hopper base which comprises an outer ring part 60$^a$ adapted to be bolted upon the upper frame part of the seed boot, and a central bottom plate part 60$^b$. The plate part 60$^b$ has its center raised and slopes downward and outward, as shown in Fig. 13. 61 is the annular seed plate which comprises a main body part 61$^a$ having its inclined surface fitting the inclined or conical surface 62 of the hopper bottom 60$^b$, and an outward extending horizontal flange 61$^b$. This flange overlies and is connected to a bevel gear 63 which has a bearing support upon the hopper base 60 and which is adapted to mesh with and be driven by a pinion on the seeder shaft in the usual manner. The seed cells of the seed plate are in the form of cavities or recesses 64 formed in the lower inclined face of the body part 61$^a$ of the plate, the inclined surface 62 of the hopper bottom plate forming one of the side walls of the cell. As will be seen from a comparison of Figs. 11 and 12, the side walls of the cell at its mouth or at the intersection of the side walls with a plane parallel to the mouth of the cell, are approximately at right-angles to each other. The upper inclined wall 65 of each cell, however, is not parallel to the bottom wall formed by the bottom plate of the hopper, but is curved downward as shown in Fig. 11, so that the radial width of the cell diminishes from its mouth to its lower side.

66 is a ring casting pivotally connected at its front side by the pin 66$^a$ with the base casting 60. At its rear side the ring is formed with a flange 66$^b$, which rests upon a similar flange formed upon the base 60, and both flanges are perforated to receive a fastening bolt 67. The upper edge of the ring 66 is formed with a shoulder to receive a side wall 68 of the hopper. On its inner side the ring 66 is formed with a flange 66$^c$ which extends inward and downward with its inner edge lying closely adjacent the upper edge of the main part of the seed plate 61. It will be seen that the inclined conical surface 62 and the inward inclined upper surface of the flange 66$^c$ form an annular downward converging passage or trough into which the seeds settle and at the very bottom of which is disposed the upper edge of the seed plate. With this construction the seeds find their way eventually to the conical surface 62, upon which they slide downward edgewise into the seed cells and there rest with their greatest dimension or length extending circumferentially of the seed plate.

At its rear side the bottom plate 60$^b$ is formed with a discharge aperture 69 which registers with the passage 70 leading to the dropping valves in the duct of the seed boot.

Above the aperture 69 are arranged the knock-out and cut-off. The cut-off is in the form of a rectangular plate 71 formed at its outer end with a cylindrical enlargement 71ᵃ which pivotally engages the ring casting 66. At its inner end the lower face of the cut-off plate rests upon the upper edge of the seed plate and covers the mouths of the cells as they pass under it. A coiled spring 72 interposed between the cut-off and a housing 73 presses the cut-off yieldingly against the edge of the seed plate. The housing 73 is secured in position by a screw 74 and it has a depending flange 73ᵃ which engages the cylindrical end of the cut-off plate and secures it against displacement. The knock-out consists of a rectangular plate 75 which is formed and mounted in a manner substantially similar to the form and mounting of the cut-off except that the knock-out is formed with a depending lug 75ᵃ which is adapted to enter the mouth of a seed cell as it passes under the knock-out for the purpose of positively discharging the seed through the aperture 69.

The operation is, in a general way, similar to that of the seed plate previously described. That is to say, the single seeds which find their way into the seed cells are carried with the plate as it turns and at the cut-off are separated from the mass of superposed seeds and at the knock-out are discharged through the aperture 69 leading to the dropping mechanism which, of course, may be of any preferred form. It is to be noted, however, that in this modification, as in the one first described, the seed cells are inclined to the plane of rotation of the plate, so that the individual seeds contained in the cells are more or less relieved of the weight and pressure of the superposed mass of seeds, with the resulting advantages hereinbefore referred to. It will be seen, too, that this second form of plate is of such character that all three dimensions of the cells can be varied without changing the external dimensions of the plate, so that a series of interchangeable plates can be provided as in the case of the construction first described. Also the cells are gradually contracted toward their lower side so that comparatively thick narrow seeds are prevented from crowding to the bottom of the cells as far as they would if the dimensions of the cells were uniform from top to bottom. The importance of this feature is, of course, that it overcomes the tendency for more than one seed to crowd into the same cell.

What I claim is:

1. In a planter, a seed separating mechanism comprising in combination a horizontal seed plate having at its edge a series of individual seed cells in the form of cavities or depressions in the under side thereof and inclined to the plane of rotation of the plate, the plate being provided with parts positioned to prevent more than a single seed from entering a cell and a stationary wall over which said cavities move as the plate turns, said stationary wall constituting the seed supporting wall of each cell and being provided with an aperture through which the seeds are discharged from the cells.

2. In a planter, a seed separating mechanism comprising in combination a horizontal seed plate having at its edge a series of individual seed cells inclined to the plane of rotation of the plate, said cells being in the form of cavities or depressions in the underside of the plate, a stationary wall over which said cavities move as the plate turns, said stationary wall constituting the seed supporting wall of each cell, and a cut-off coöperating with the seed plate having its working edge disposed at an oblique angle to the top and bottom walls of the cells.

3. In a planter, a seed separating mechanism comprising in combination a horizontal seed plate having at its edge a series of individual seed cells inclined to the plane of rotation of the plate, said cells being in the form of cavities or depressions in the underside of the plate, a stationary wall over which said cavities move as the plate turns, said stationary wall constituting the seed supporting wall of each cell, and hopper walls above the cells forming a downward contracting annular passage terminating at the mouths of the cells.

4. In a planter, a seed separating mechanism comprising in combination a horizontal seed plate having at its edge a series of individual seed cells inclined to the plane of rotation of the plate, said cells being in the form of cavities or depressions in the underside of the plate, a stationary wall over which said cavities move as the plate turns, said stationary wall constituting the seed supporting wall of each cell, and hopper walls above the cells forming a downward contracting annular passage terminating at the mouths of the cells, one of said hopper walls forming a substantially unbroken continuation of the seed supporting wall of the cells.

5. In a planter, a seed separating mechanism comprising in combination a horizontal seed plate having at its outer edge a series of downward and inward inclined seed cells, said cells being in the form of cavities or depressions in the under side of the plate, a stationary wall over which said cavities move as the plate turns, said stationary wall constituting the seed supporting wall of each cell, a hopper bottom plate mounted on and turning with the seed plate, said bottom plate being inclined downward and outward from its center to its periphery which lies just inside the mouths of the seed cells, and a hopper side wall constituting an upward and outward extension of the aforesaid stationary wall, said side wall and hopper bottom plate forming a downward contracting annular passage leading to the mouths of the seed cells.

6. In a planter, a rotary seed plate having downward opening inclined cells, part of the rotary plate lying above each cell in position to prevent more than a single seed from entering the cell.

7. In a planter, a rotary seed plate having a series of inclined seed cells at its edge with inclined rotary walls over each cell in position to prevent more than a single seed from entering the cell, the bottom of the cell being open downward.

8. In a planter, a rotary seed plate having a series of inclined cells with an inclined rotary wall above each cell in position to prevent more than a single seed from entering the cell, and a rotary cap or cover extending diametrically from each of said walls to those opposite.

9. In a planter, the combination with a stationary bottom having a seed escape orifice, of a rotary seed plate having a series of inclined cells, and an inclined rotary wall above each cell in position to prevent more than a single seed from entering the cell, said cells opening downward and adapted to register with the said seed orifice.

10. In a planter, a seed separating mechanism comprising in combination a horizontal rotatable seed plate having a downward and inward inclined peripheral surface in which are formed seed cells having inner walls parallel with the said peripheral surface, and a stationary bottom having an annular downward and inward inclined surface adapted to serve as the bottom walls for the seed cells, the said surface having an aperture for the reception of seeds from the cells.

11. In a planter, a seed separating mechanism comprising in combination a horizontal rotary seed plate having at its periphery an annular downward and outward projection in the under part of which are formed seed cells having downward and inward inclined top walls and substantially vertical inner walls, and a stationary bottom having an annular inclined surface adapted to serve as the bottom walls of the seeds, the said surface having an aperture for the reception of seeds from the cells.

12. In a planter, a seed separating mechanism comprising in combination, a rotary horizontal seed plate having at its edge a series of individual seed cells inclined to the plane of rotation of the plate, the said cells being in the form of cavities in the under side of the plate, a stationary inclined wall over which the said cavities move as the plate turns, the said stationary wall constituting the seed separating walls of the cells, and hopper walls above the cells forming a downward contracting annular passage terminating at the mouths of the cells and having a width at its bottom substantially equivalent to the width of the cell mouths.

13. In a planter, a seed separating mechanism comprising in combination a seed containing hopper, a rotary horizontal seed plate located at the bottom of the hopper and having a downward and inward inclined peripheral surface, and a series of teeth extending downward and radially outward from the said surface, and a stationary bottom having an inclined surface adapted to coöperate with the edges of the said teeth and with the peripheral surface of the plate to form a series of downward and inward inclined seed cells, the outer open mouths of which are vertically beneath a mass of seeds in the hopper, the said bottom surface having an aperture for the reception of seeds from the cells.

In testimony whereof I affix my signature, in presence of two witnesses.

CHARLES E. WHITE.

Witnesses:
 OSCAR F. LUNDAHL,
 ROBERT M. ADAMS.

Copies of this patent may be obtained for five cents each, by addressing the "Commissioner of Patents, Washington, D. C."